(12) United States Patent
Necessary et al.

(10) Patent No.: US 7,748,162 B1
(45) Date of Patent: Jul. 6, 2010

(54) MODULAR GREENHOUSE SYSTEM

(76) Inventors: Elmer L. Necessary, 305 "G" St., Apt. B, Waterford, CA (US) 95386; Stacy L. Necessary, 305 "G" St., Apt. B, Waterford, CA (US) 95386

( * ) Notice: Subject to any disclaimer, the term of this patent is extended or adjusted under 35 U.S.C. 154(b) by 758 days.

(21) Appl. No.: 11/441,322

(22) Filed: May 26, 2006

(51) Int. Cl.
*A01G 9/16* (2006.01)
(52) U.S. Cl. .......................................... 47/17
(58) Field of Classification Search ............... 47/18, 47/17, 19.1, 19.2, 68, 29.1–29.4
See application file for complete search history.

(56) References Cited

U.S. PATENT DOCUMENTS

| | | | | |
|---|---|---|---|---|
| 1,876,571 A * | 9/1932 | Acuff | ............................. | 47/18 |
| 2,242,149 A | 5/1941 | Shelley | | |
| 3,114,377 A * | 12/1963 | Clement | ...................... | 135/160 |
| 3,424,178 A * | 1/1969 | Yazaki | ......................... | 135/157 |
| 3,812,616 A * | 5/1974 | Koziol | ............................. | 52/63 |
| 4,057,941 A | 11/1977 | Schwartz | | |
| 4,793,286 A * | 12/1988 | Buxton | ........................ | 119/498 |
| 4,878,322 A * | 11/1989 | Ikeda et al. | ................... | 52/2.18 |
| 5,216,834 A * | 6/1993 | Crowley | ......................... | 47/17 |
| 5,333,421 A * | 8/1994 | McKenna | ....................... | 52/86 |
| 5,598,668 A * | 2/1997 | Isom | .............................. | 52/86 |
| 6,434,882 B1 * | 8/2002 | Becker | ........................ | 47/19.1 |

* cited by examiner

*Primary Examiner*—Son T. Nguyen

(57) ABSTRACT

A modular greenhouse system for permitting a greenhouse of desired size to be created in a desired location includes a container defined by a plurality of panels removably coupled together and forming a perimeter wall. Each of a plurality of locking pins is engageable to the panels of the container. Each of a plurality of stanchions slidably receives a portion of the locking pins extending upwardly from the panels. Each of a plurality of ceiling joists is coupled to a pair of the stanchions opposite the container and extending across a width of the container. Each of a plurality of spanners extends between and is engageable to the ceiling joists and is configured to maintain positioning of the ceiling joists.

13 Claims, 11 Drawing Sheets

MODULAR GREENHOUSE SYSTEM

BACKGROUND OF THE INVENTION

1. Field of the Invention

The present invention relates to modular greenhouses and more particularly pertains to a new modular greenhouse for permitting a greenhouse of desired size to be created in a desired location.

2. Description of the Prior Art

The use of modular greenhouses is known in the prior art. U.S. Pat. No. 2,242,149 describes a system for arranging a plurality of plant containers to form a seedbed. Another type of modular greenhouse is U.S. Pat. No. 4,057,941 for constructing a greenhouse of a desired length that is entirely enclosed and separates articles in the greenhouse from the environment.

While these devices fulfill their respective, particular objectives and requirements, the need remains for a system that has certain improved features that allow for a garden to be readily exposed to the environment when desired and easily separated from the environment to protect the garden from inclement weather while permitting the greenhouse to be assembled to a desired size

SUMMARY OF THE INVENTION

The present invention meets the needs presented above by generally comprising a container defined by a plurality of panels removably coupled together and forming a perimeter wall. Each of a plurality of locking pins is engaged to the panels of the container. Each of a plurality of stanchions slidably receives a portion of the locking pins extending upwardly from the panels and each of the stanchions extends upwardly from the panels. Each of a plurality of ceiling joists is coupled to a pair of the stanchions opposite the container and extends across a width of the container. Each of a plurality of spanners extends between and is engaged to the ceiling joists to maintain positioning of the ceiling joists.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
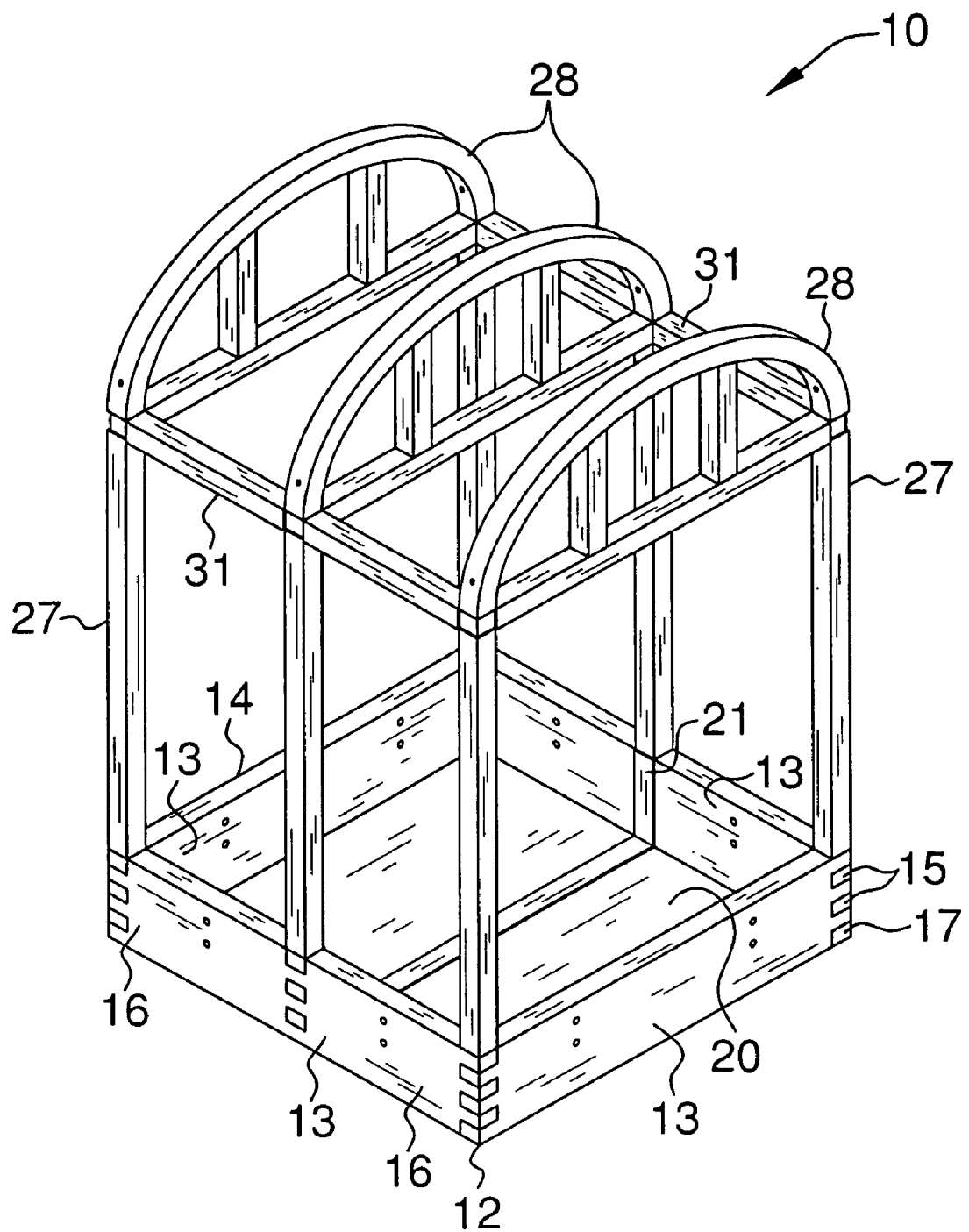
FIG. 1 is a perspective view of a modular greenhouse system according to the present invention.

With reference now to the drawings, and in particular to FIGS. 1 through 12 thereof, a new modular greenhouse embodying the principles and concepts of the present invention and generally designated by the reference numeral 10 will be described.

As best illustrated in FIGS. 1 through 12, the modular greenhouse system 10 generally comprises a container 12 being defined by a plurality of panels 13 removably coupled together and forming a perimeter wall 14. Each of the panels 13 includes fingers 15 extending outwardly from opposing ends 16 of the associated one of the panels 13. The fingers 15 of one of the panels 13 interlocks with the fingers 15 of an adjacently positioned one of the panels 13 to form a finger joint 17. Each of the fingers 15 has a finger aperture 18 extending therethrough and is aligned with the finger aperture 18 of each of the fingers 15 of the adjacent one of the panels 13 when the panels 13 are joined together. At least two of the panels 13 have a plurality of vertically orientated ports 19 extending through the associated one of the panels 13 and is positioned between the opposing ends 16 of the associated one of the panels 13. Additionally, the container 12 may include a bottom wall 20 that extends across the panels 13 that is positioned against the ground surface to inhibit entrance of pests into the container 12 from below the container 12. The panels 13 may also be placed directly on the ground surface to allow the ground surface to constitute the bottom wall 20 of the container 12.

At least one brace 21 engages the ports 19 of the at least two of the panels 13 and extends across a width of the container 12 to inhibit the panels 13 from bowing outwardly when dirt is placed in the container 12. The at least one brace 21 includes a plurality of tabs 22 extending outwardly from distal ends 23 of the at least one brace 21. Each of the tabs 22 is laterally insertable into one of the ports 19. Each of the tabs 22 has a tab aperture 24 extending therethrough and is aligned with a securing aperture 25 of each of the associated pair of the panels 13 positioned orthogonally to the ports 19.

Each of a plurality of locking pins 26 is insertable into aligned ones of the finger apertures 18 of the finger joints 17, to secure the panels 13 adjacent to the finger joint 17 together, and into aligned ones of the tab apertures 24 and the securing apertures 25 of the associated pair of the panels 13 to secure the at least one brace 21 to the associate pair of the panels 13. Each of a plurality of stanchions 27 receives a portion of the locking pins 26 extending upwardly from the panels 13. Each of the stanchions 27 extends upwardly from the panels 13.

Each of a plurality of ceiling joists 28 is coupled to a pair of the stanchions 27 opposite the container 12 and extends across the width of the container 12. Each of the ceiling joists 28 includes a plurality of securing pins 29 extending downwardly from the ceiling joists 28 and is insertable into the stanchions 27 to secure the ceiling joists 28 to the stanchions 27. Each of the ceiling joists 28 includes a plurality of spanner pins 30 extending orthogonally to the securing pins 29. Each of a plurality of spanners 31 extends between and is engaged to one of the spanner pins 30 of each of adjacently positioned ceiling joists 28 and is configured to maintain positioning of the ceiling joists 28. At least one vent 32 is coupled to one of the ceiling joists 28.

Figure 2:
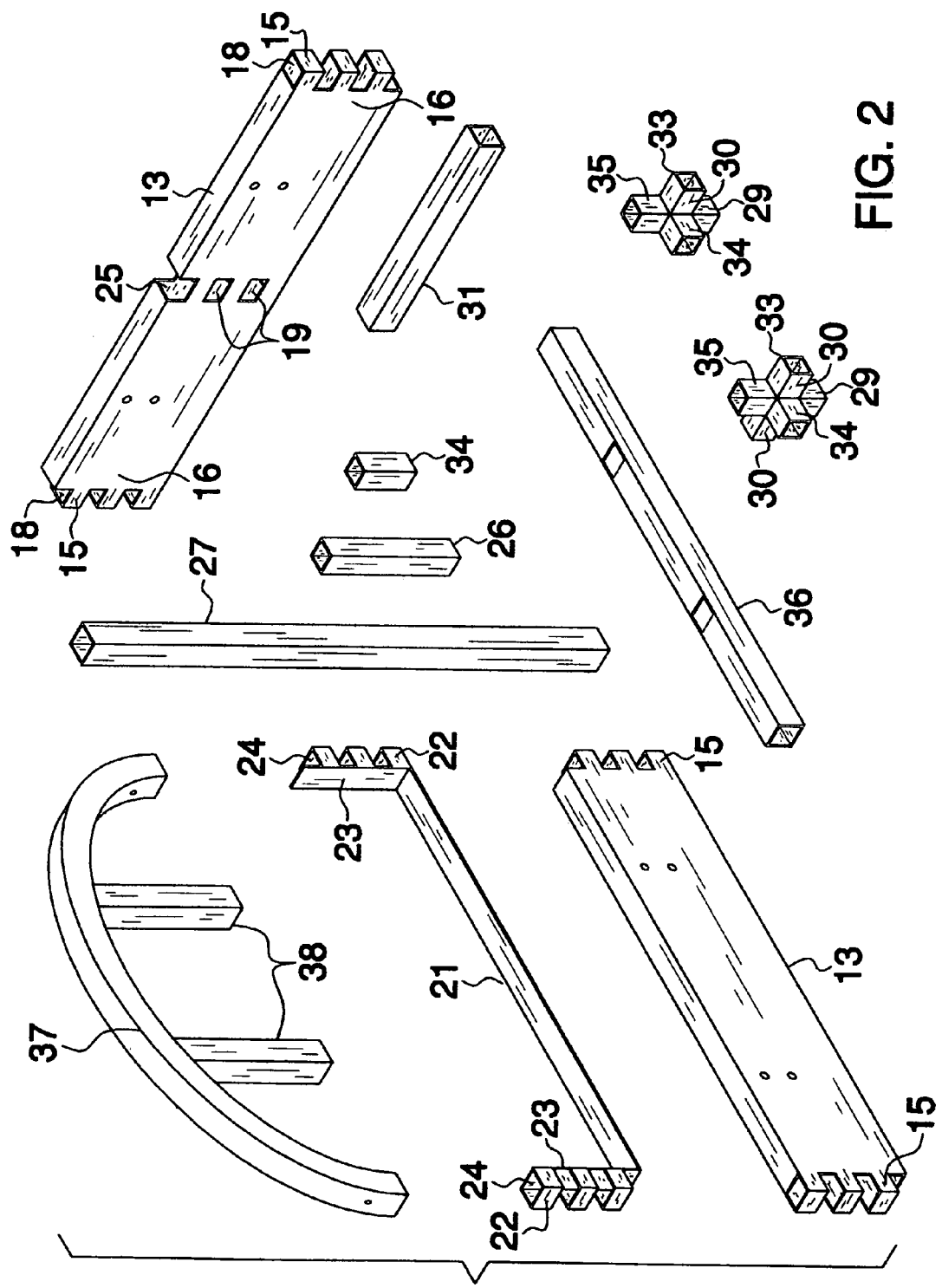
FIG. 2 is an exploded perspective view of the present invention.
Figure 3:
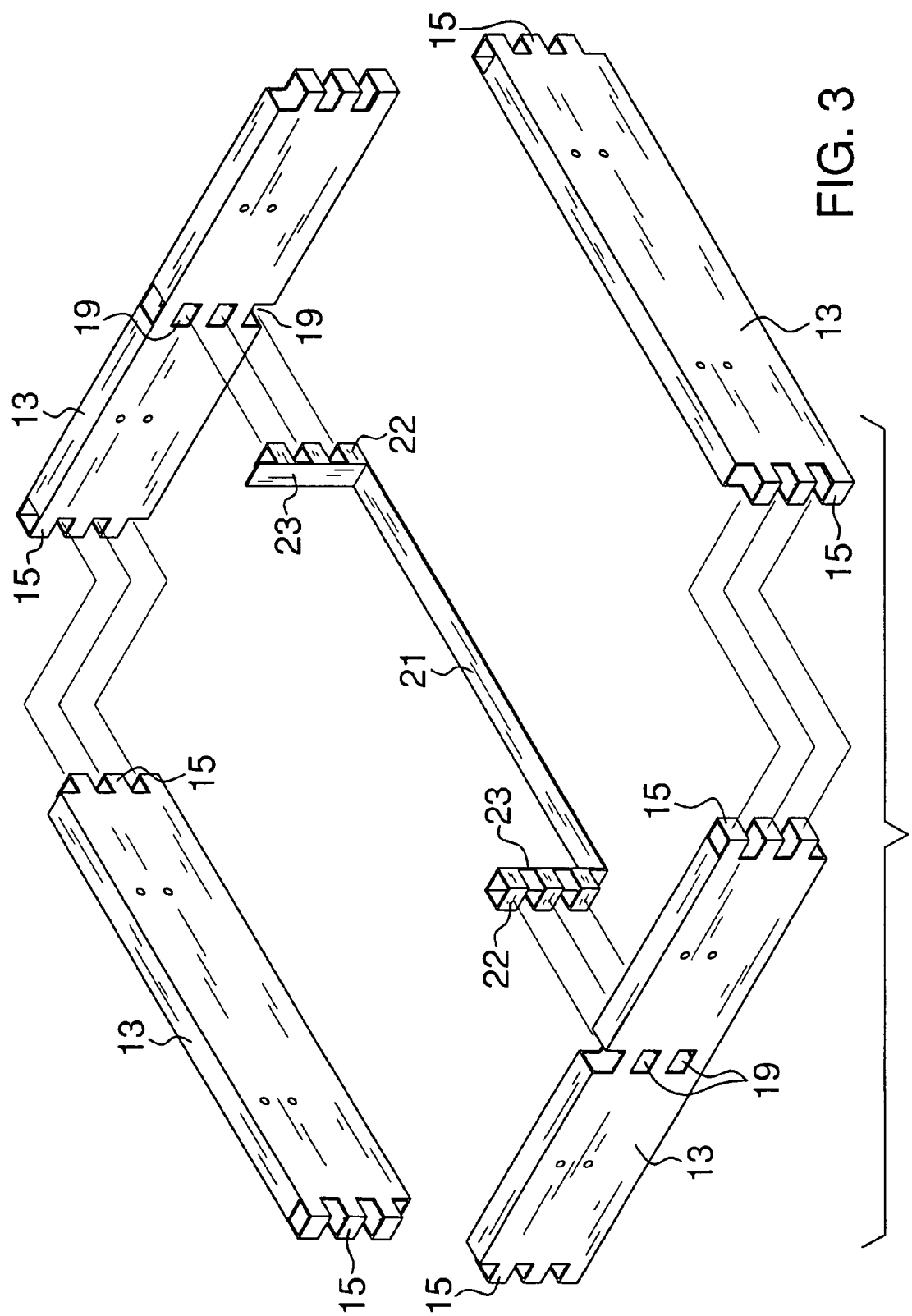
FIG. 3 is an exploded perspective view of the container of the present invention.
Figure 4:
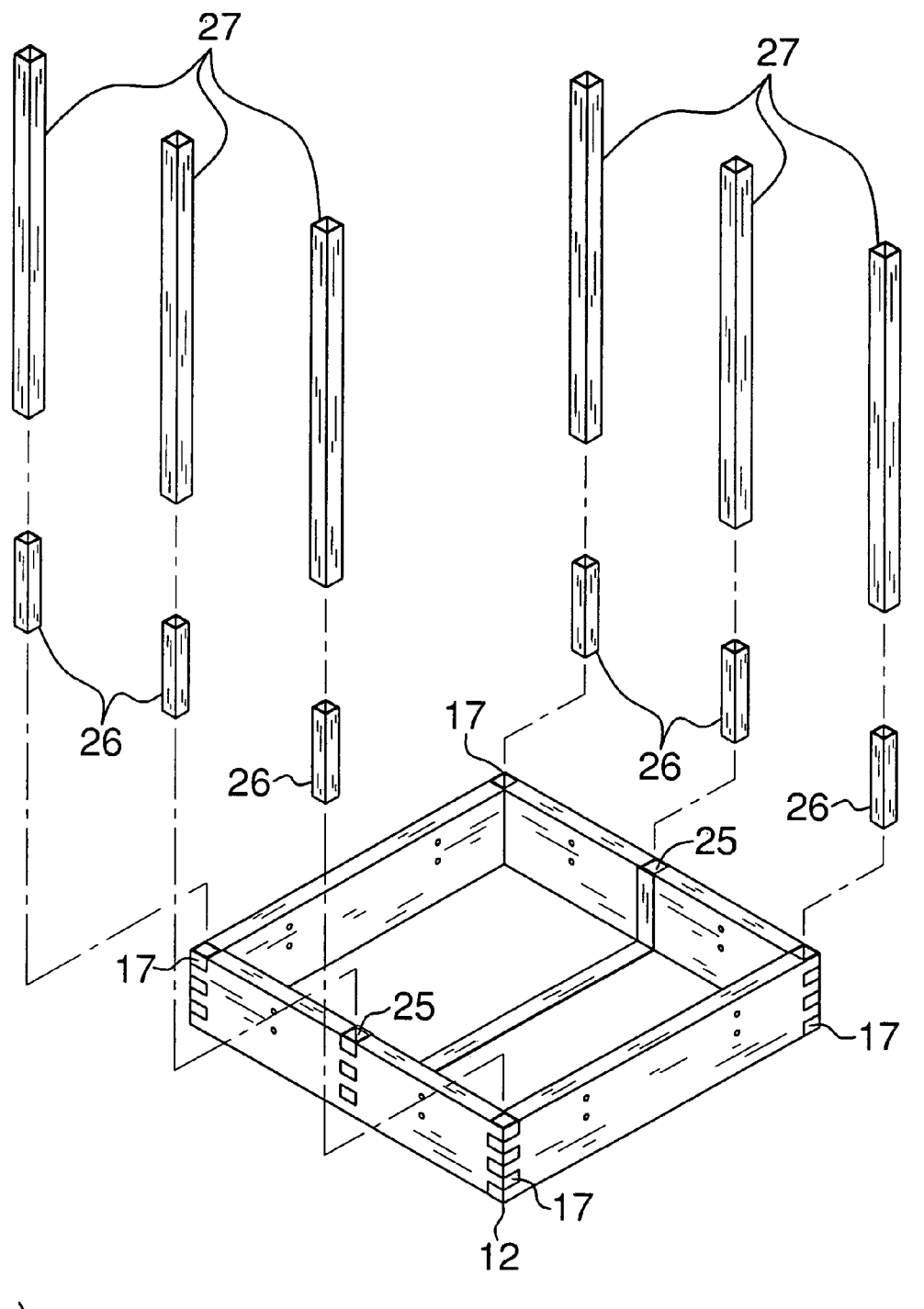
FIG. 4 is an exploded perspective view of the container and stanchions of the present invention.
Figure 5:
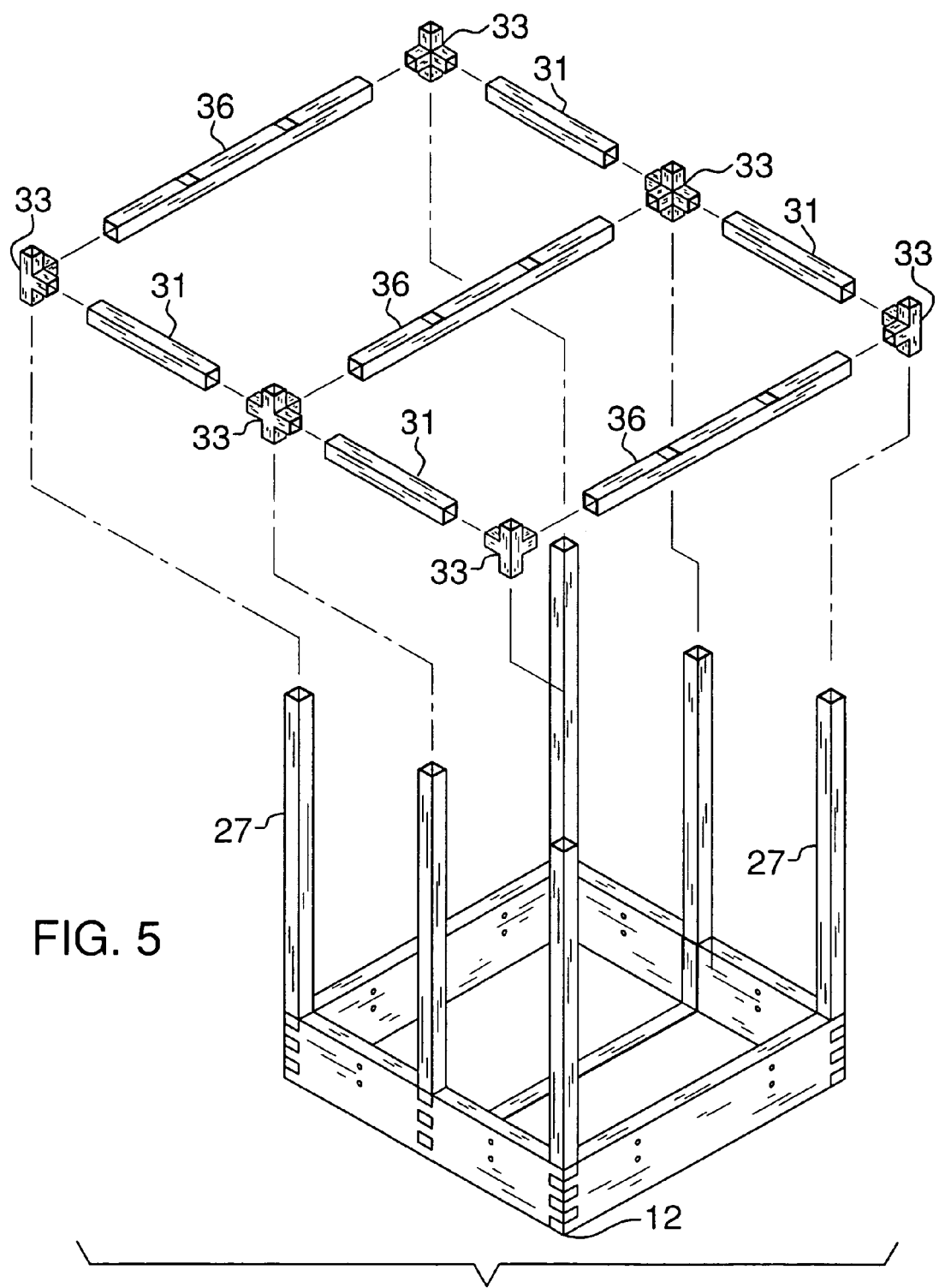
FIG. 5 is an exploded perspective view of the spanners of the present invention.
Figure 6:
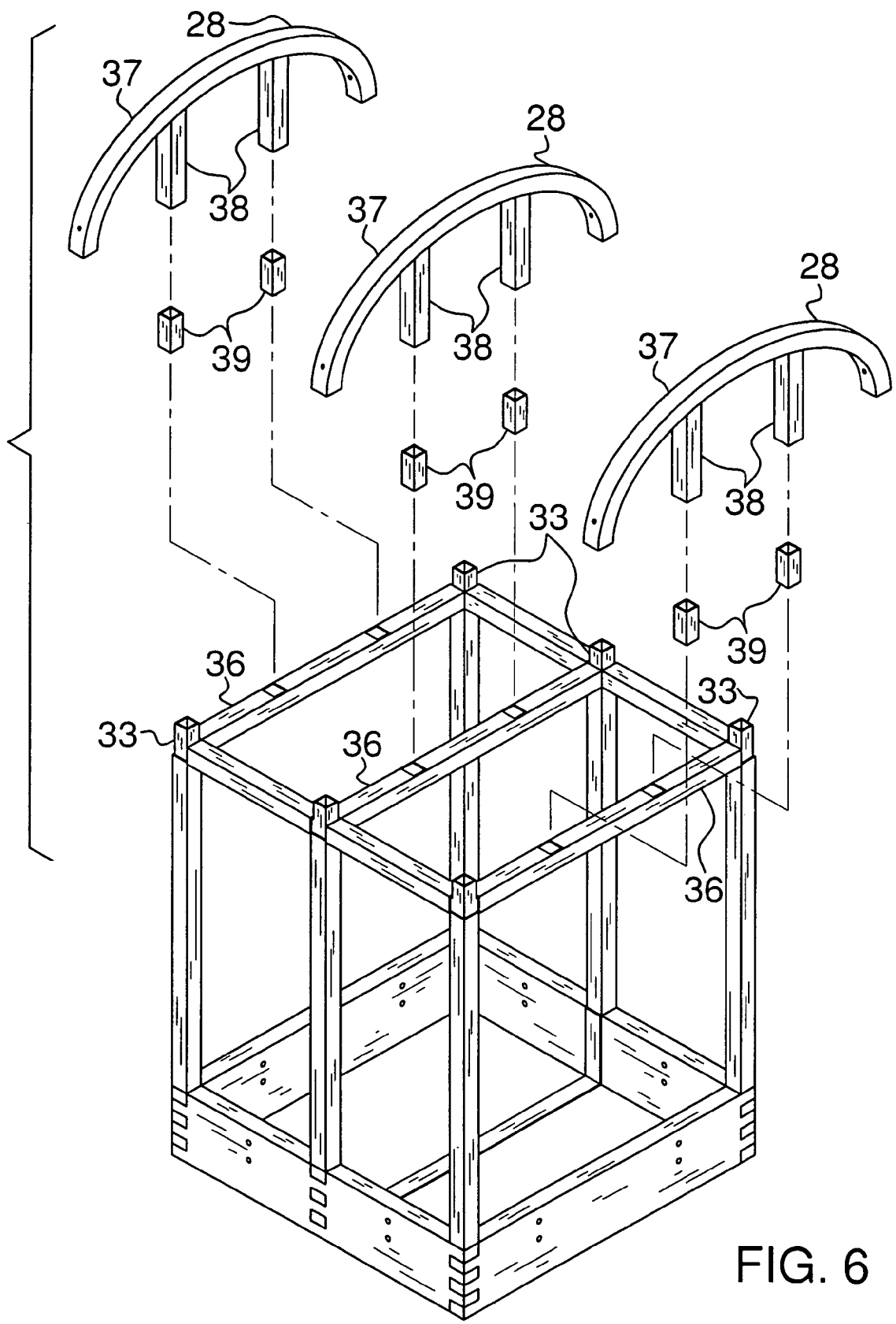
FIG. 6 is an exploded view of the ceiling joists of the present invention.
Figure 7:
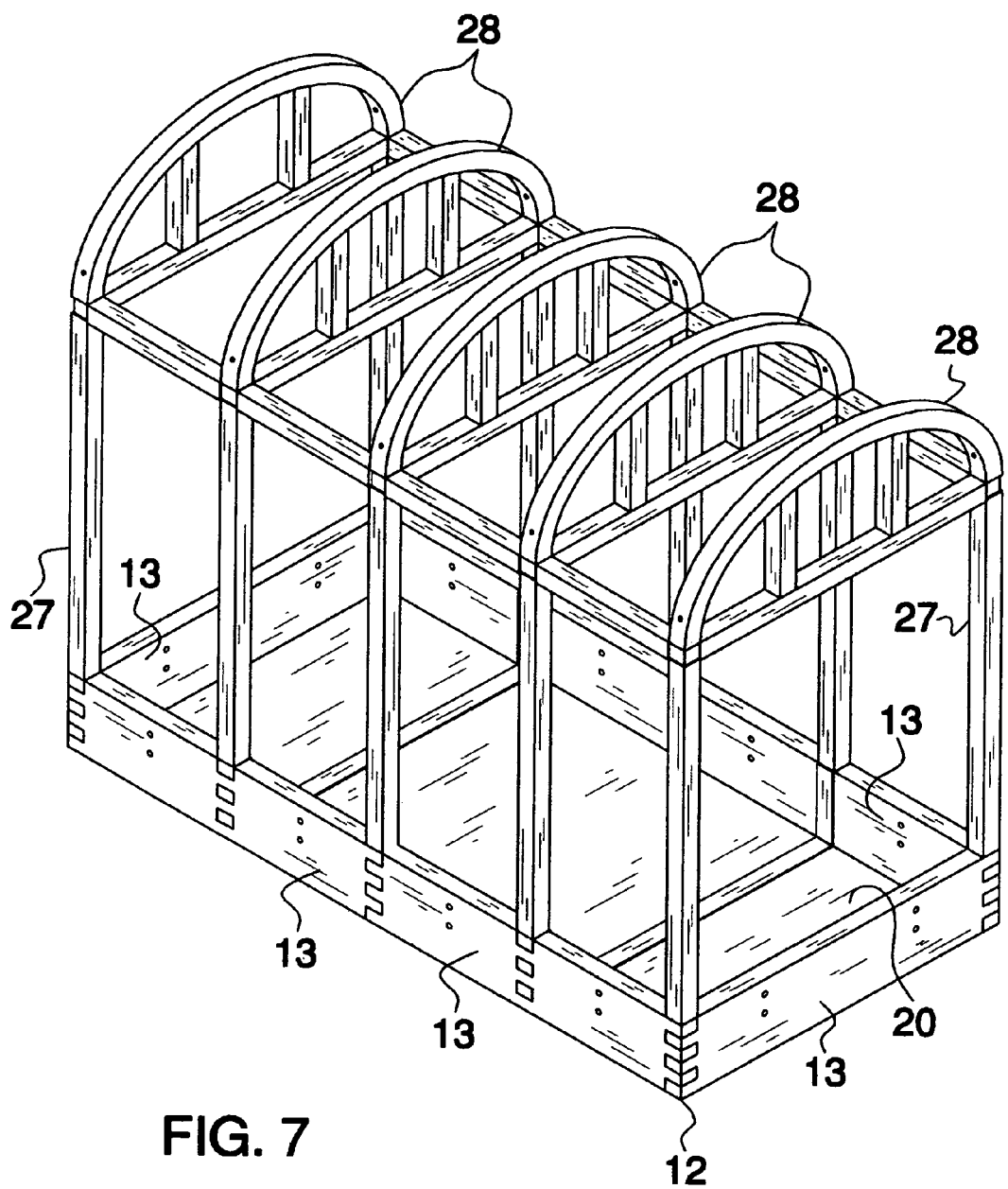
FIG. 7 is a perspective view of the present invention with additional panels in place.
Figure 8:
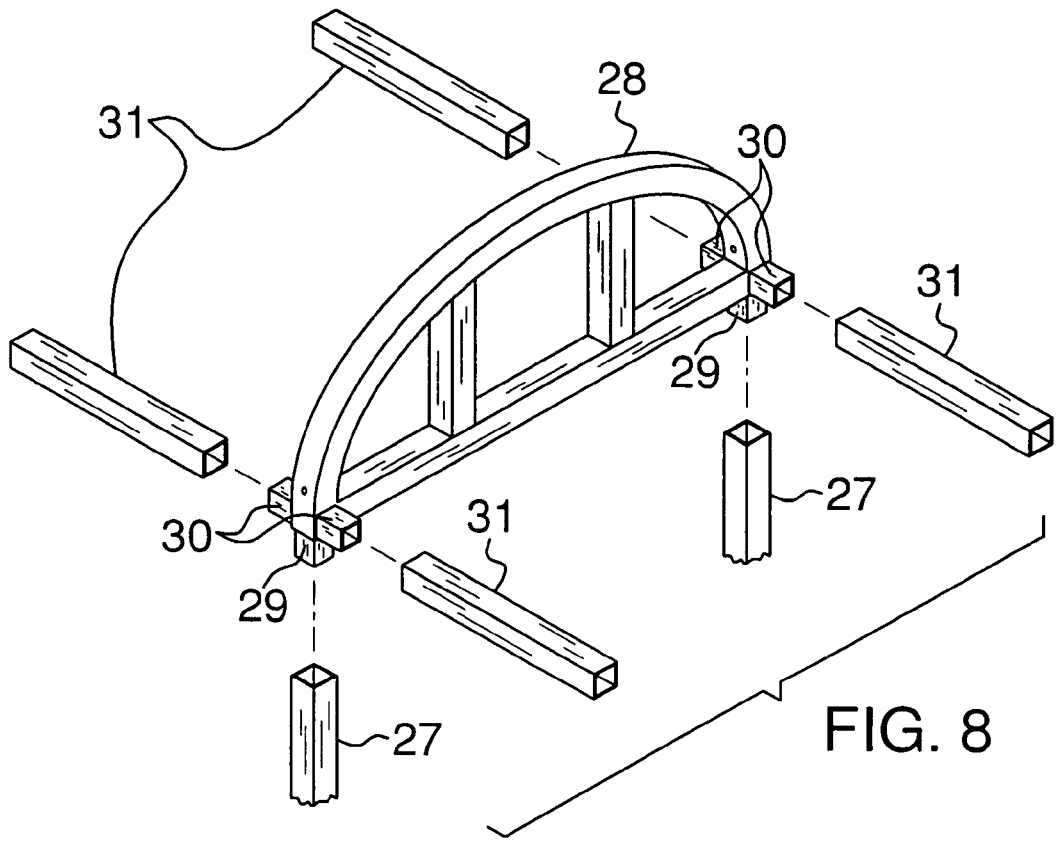
FIG. 8 is a perspective view of an embodiment of the ceiling joists of the present invention.
Figure 9:
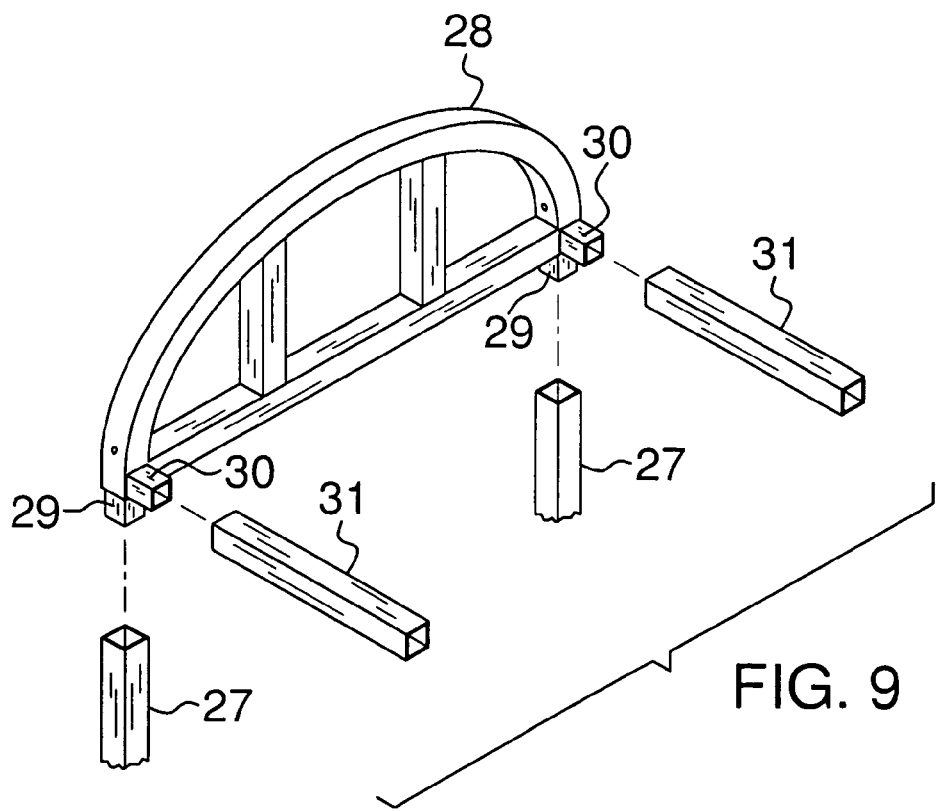
FIG. 9 is a perspective view of an embodiment of the ceiling joists of the present invention.
Figure 10:
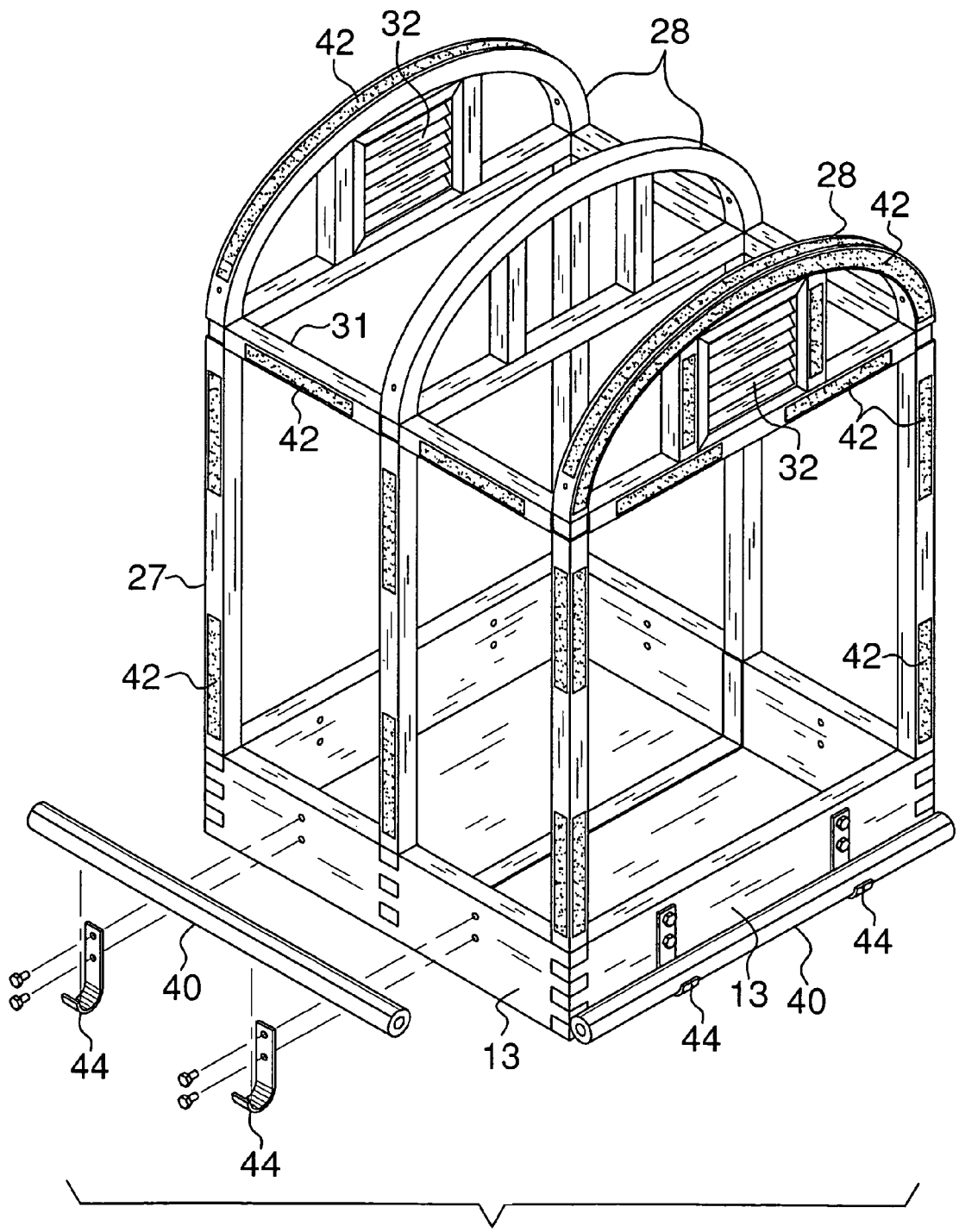
FIG. 10 is a perspective view of the present invention with the side sheets rolled up.
Figure 11:
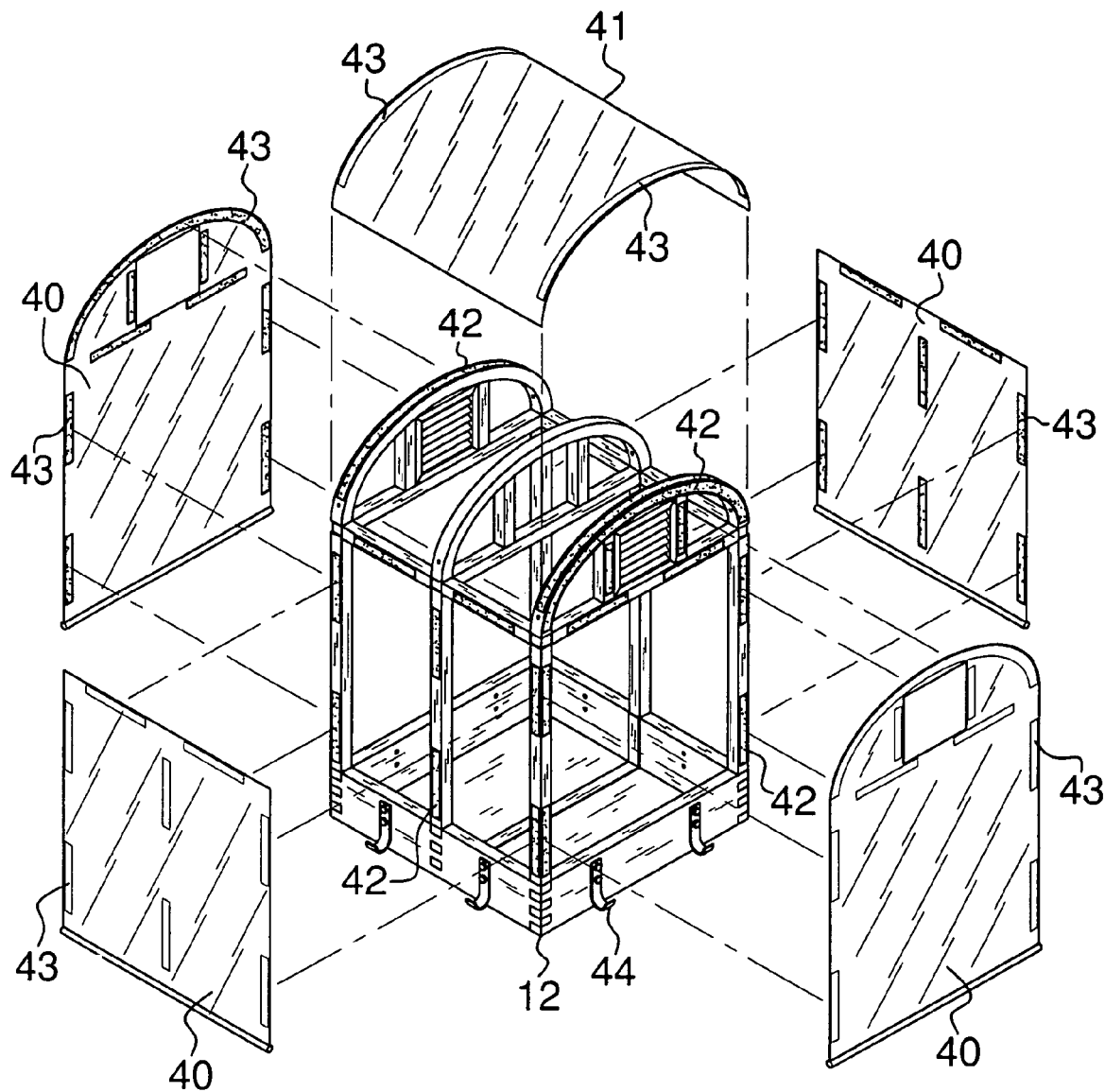
FIG. 11 is a perspective view of the present invention with the side sheets and the top sheet exploded away.
Figure 12:
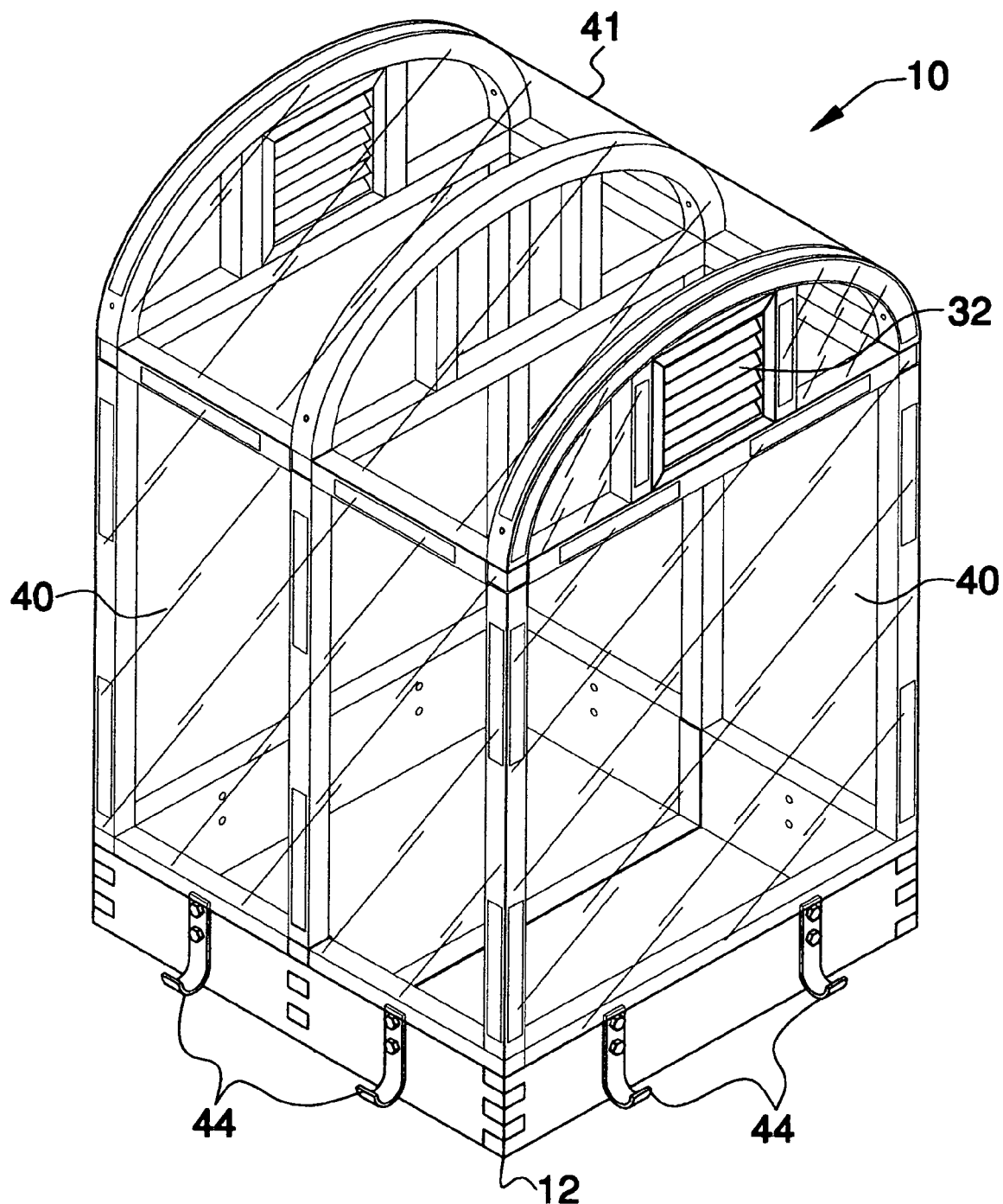
FIG. 12 is a perspective view of the present invention with the side sheets and the top sheet in place.

As shown in FIGS. 8 and 9, the ceiling joists 28 include an embodiment with the spanner pins 30 extending on one side only of the associated one of the ceiling joists 28 for positioning at the ends of a run of ceiling joists 28. Another embodiment has the spanner pins 30 extending from both sides of the associated one of the ceiling joists 28 for positioning of the associated one of the ceiling joists 28 between other ceiling joists 28. As shown in FIGS. 2, 5 and 6, each of the ceiling joists 28 has a pair of coupler members 33 each comprising a securing pin 29, at least one spanner pin 30, a lateral pin 34 and a top pin 35. The top pin 35 is positioned opposite the securing pin. Each of the ceiling joists 28 includes a beam 36 slidably receiving the lateral pin 34 of each of the coupler members 33 and extending between the coupler members 33. Each of the ceiling joists 28 includes an arch 37 slidably receiving the top pin 35 of each of the coupler members 33 and arcuately extending over the beam 36. Each of the ceiling joists 28 includes a pair of supports 38 extending downwardly from the arch 36. A pair of mounting pins 39 of each of the ceiling joists 28 is slidably inserted into the beam 36 and extends upwardly and is inserted into the supports 38 to maintain alignment of the arch 37 with the beam 36 when the arch 37 receives the top pin 35 of each of the coupler members 33.

Each of plurality of side sheets 40 is removably couplable to the stanchions 27, the spanners 31 and the ceiling joists 28. Each the side sheets 40 extends between the stanchions 27, the spanners 31 and the container 12 to close areas there between to inhibit inclement weather from passing therethrough. Each of the side sheets 40 comprises a substantially transparent material to permit sunlight to pass through the side sheets 40. At least one top sheet 41 is removably couplable to the ceiling joists 28 and extends between the ceiling joists 28 to close areas between the ceiling joists 28 and inhibit inclement weather from passing between the ceiling joists 28. The at least one top sheet 41 comprises a substantially transparent material to permit sunlight to pass through the at least one top sheet 41. The vent 32 permits selective thermal communication between an environment enclosed by the side 40 and top 41 sheets and an environment outside of the side sheets 40 and the top sheet 41 to maintain a desired temperature of the environment around the garden.

Each of a plurality of first fastener members 42 is coupled to the stanchions 27, the spanners 31 and the ceiling joists 28. A plurality of second fastener members 43 is coupled to the side sheets 40 and the at least one top sheet 41. The second fastener members 43 are selectively engaged to the first fastener members 42 to releasably secure the side sheets 40 and the at least one top sheet 41 to the stanchions 27, the spanners 31 and the ceiling joists 28.

Each of a plurality of hooks 44 is coupled to one of the panels 13 and each of the panels 13 has two hooks 44 coupled thereto. The hooks 44 are configured for receiving and supporting one of the side sheets 40 that has been rolled up when an associated one of the side sheets 40 has been removed from the stanchions 27, the spanners 31 and the ceiling joists 28.

In use, the container 12 is positioned on the ground surface and the stanchions 27 are coupled to the container 12. The ceiling joists 28 are then coupled to the stanchions 27 and the spanners 31 coupled to the ceiling joists 28. The dirt is then placed in the container 12 and the garden planted. The side sheets 40 and the top sheet 41 are put in place to protect the garden from inclement weather and one of the side sheets 40 can be removed to allow access to the garden.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A modular greenhouse system for permitting a garden to be established, the system comprising:
   a container being defined by a plurality of panels removably coupled together and forming a perimeter wall;
   a plurality of locking pins, each of said locking pins being engageable to said panels of said container;
   a plurality of stanchions, each of said stanchions slidably receiving a portion of said locking pins extending upwardly from said panels, wherein each of saidstanchions extends upwardly from said panels;
   a plurality of ceiling joists, each of said ceiling joists being coupled to a pair of said stanchions opposite said container and extending across a width of said container;
   a plurality of spanners, each of said spanners extending between and being engageable to said ceiling joists and being configured to maintain positioning of said ceiling joists;
   a plurality of side sheets, each of said side sheets being removably couplable to said stanchions, said spanners and said ceiling joists, each said side sheets extending between said stanchions, said spanners and said container to close areas therebetween to inhibit inclement weather from passing therethrough; and
   a plurality of hooks, each of said hooks being coupled to one of said panels wherein each of said panels has two hooks coupled thereto, said hooks being configured for receiving and supporting one of said side sheets that has been rolled up when an associated one of said side sheets has been removed from said stanchions, said spanners and said ceiling joists.

2. The system according to claim 1, wherein each of said panels includes fingers extending outwardly from opposing ends of the associated one of said panels, said fingers of one of said panels interlocking with said fingers of an adjacently positioned one of said panels to form a finger joint.

3. The system according to claim 2, wherein each of said fingers has a finger aperture extending therethrough and being aligned with said finger aperture of each of said fingers of the adjacent one of said panels when said panels are joined together, one of said locking pins being insertable into aligned ones of said finger apertures of each of said finger joints.

4. The system according to claim 1, wherein at least two of said panels has a plurality of vertically orientated ports extending trough the associated one of said panels and being positioned between said opposing ends of the associated one of said panels; and
   at least one brace engaging said ports of the at least two of said panels and extending across the width of said container to inhibit said panels from bowing outwardly when dirt is placed in said container.

5. The system according to claim 4, wherein said at least one brace includes a plurality of tabs extending outwardly from distal ends of said at least one brace, each of said tabs being laterally insertable into one of said ports, each of said tabs having a tab aperture extending therethrough and being aligned with a securing aperture of each of the associated pair of said panels positioned orthogonally to said ports, one said locking pins being insertable into aligned ones of said tab apertures and said securing apertures.

6. The system according to claim 1, wherein each of said ceiling joists includes a plurality of securing pins extending downwardly from said ceiling joists and being insertable into said stanchions to secure said ceiling joists to said stanchions.

7. The system according to claim 6, wherein each of said ceiling joists includes a plurality of spanner pins extending orthogonally to said securing pins, each of said spanners being engageable to one of said spanner pins of each of adjacently positioned ceiling joists and being configured to maintain positioning of said ceiling joists.

8. The system according to claim 1, wherein each of said side sheets comprises a substantially transparent material to permit sunlight to pass through said side sheets.

9. The system according to claim 1, further comprising at least one top sheet being removably couplable to said ceiling joists and extending between said ceiling joists to close areas between said ceiling joists and inhibit inclement weather from passing between said ceiling joists.

10. The system according to claim 9, wherein said at least one top sheet comprises a substantially transparent material to permit sunlight to pass through said at least one top sheet.

11. The system according to claim 9, wherein a plurality of first fastener members are coupled to said stanchions, said spanners and said ceiling joists, a plurality of second fastener members being coupled to said side sheets and said at least one top sheet, said second fastener members being selectively engaged to said first fastener members to releasably secure said side sheets and said at least one top sheet to said stanchions, said spanners and said ceiling joists.

12. The system according to claim 9, further comprising at least one vent being coupled to one of said ceiling joists, said vent permitting thermal communication between an environment around the garden and an environment outside of said side sheets and said top sheet to maintain a desired temperature of the environment around the garden when said side sheets and said top sheet are coupled to said stanchions, said spanners and said ceiling joists.

13. A modular greenhouse system for permitting a garden to be established, the system comprising:
   a container being defined by a plurality of panels removably coupled together and forming a perimeter wall, each of said panels including fingers extending outwardly from opposing ends of the associated one of said panels, said fingers of one of said panels interlocking with said fingers of an adjacently positioned one of said panels to form a finger joint, each of said fingers having a finger aperture extending therethrough and being aligned with said finger aperture of each of said fingers of the adjacent one of said panels when said panels are joined together, at least two of said panels having a plurality of vertically orientated ports extending through the associated one of said panels and being positioned between said opposing ends of the associated one of said panels;
   at least one brace engaging said ports of the at least two of said panels and extending across a width of said container to inhibit said panels from bowing outwardly when dirt is placed in said container, said at least one brace including a plurality of tabs extending outwardly from distal ends of said at least one brace, each of said tabs being laterally insertable into one of said ports, each of said tabs having a tab aperture extending therethrough and being aligned with a securing aperture of each of the associated pair of said panels positioned orthogonally to said ports;
   a plurality of locking pins, each of said locking pins being insertable into aligned ones of said finger apertures of said finger joints and into aligned ones of said tab apertures and said securing apertures;
   a plurality of stanchions, each of said stanchions slidably receiving a portion of said locking pins extending upwardly from said panels, wherein each of said stanchions extends upwardly from said panels;
   a plurality of ceiling joists, each of said ceiling joists being coupled to a pair of said stanchions opposite said container and extending across the width of said container, each of said ceiling joists including a plurality of securing pins extending downwardly from said ceiling joists and being insertable into said stanchions to secure said ceiling joists to said stanchions, each of said ceiling joists including a plurality of spanner pins extending orthogonally to said securing pins;
   a plurality of spanners, each of said spanners extending between and being engageable to one of said spanner pins of each of adjacently positioned ceiling joists and being configured to maintain positioning of said ceiling joists;
   a plurality of side sheets, each of said side sheets being removably couplable to said stanchions, said spanners and said ceiling joists, each said side sheets extending between said stanchions, said spanners and said container to close areas therebetween to inhibit inclement weather from passing therethrough, each of said side sheets comprising a substantially transparent material to permit sunlight to pass through said side sheets;
   at least one top sheet being removably couplable to said ceiling joists and extending between said ceiling joists to close areas between said ceiling joists and inhibit inclement weather from passing between said ceiling joists, said at least one top sheet comprising a substantially transparent material to permit sunlight to pass through said at least one top sheet;
   a plurality of first fastener members being coupled to said stanchions, said spanners and said ceiling joists, a plurality of second fastener members being coupled to said side sheets and said at least one top sheet, said second fastener members being selectively engaged to said first fastener members to releasably secure said side sheets and said at least one top sheet to said stanchions, said spanners and said ceiling joists; and
   a plurality of hooks, each of said hooks being coupled to one of said panels wherein each of said panels has two hooks coupled thereto, said hooks being configured for receiving and supporting one of said side sheets that has been rolled up when an associated one of said side sheets has been removed from said stanchions, said spanners and said ceiling joists.

\* \* \* \* \*